United States Patent
Sun et al.

(10) Patent No.: US 11,249,348 B2
(45) Date of Patent: Feb. 15, 2022

(54) NEEDLE FOR REPAIRING ALIGNMENT LAYER, ALIGNMENT LAYER REPAIRING APPARATUS, AND METHOD FOR REPAIRING ALIGNMENT LAYER

(71) Applicants: BOE Technology Group Co., Ltd., Beijing (CN); Hefei Xinsheng Optoelectronics Technology Co., Ltd., Anhui (CN)

(72) Inventors: Guangyan Sun, Beijing (CN); Tieyi Zhang, Beijing (CN); Lin Huang, Beijing (CN); Yu Yang, Beijing (CN); Yu Zhu, Beijing (CN); Xiang Liu, Beijing (CN); Min Wei, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 724 days.

(21) Appl. No.: 16/080,968

(22) PCT Filed: Sep. 8, 2017

(86) PCT No.: PCT/CN2017/101020
§ 371 (c)(1),
(2) Date: Aug. 29, 2018

(87) PCT Pub. No.: WO2019/047154
PCT Pub. Date: Mar. 14, 2019

(65) Prior Publication Data
US 2021/0200005 A1    Jul. 1, 2021

(51) Int. Cl.
*G02F 1/133* (2006.01)
*G02F 1/1337* (2006.01)

(52) U.S. Cl.
CPC ...... *G02F 1/1337* (2013.01); *G02F 2201/506* (2013.01)

(58) Field of Classification Search
CPC .................. G02F 1/1337; G02F 2201/506
(Continued)

(56) References Cited

U.S. PATENT DOCUMENTS

| | | |
|---|---|---|
| 2008/0018841 A1 | 1/2008 | Rho et al. |
| 2009/0021680 A1 | 1/2009 | Onishi et al. |

(Continued)

FOREIGN PATENT DOCUMENTS

| | | |
|---|---|---|
| CN | 101416099 A | 4/2009 |
| CN | 101556407 A | 10/2009 |

(Continued)

OTHER PUBLICATIONS

First Office Action in the Chinese Patent Application No. 201780001001. X, dated Feb. 21, 2020; English translation attached.
(Continued)

*Primary Examiner* — Nathanael R Briggs
*Assistant Examiner* — William D Peterson
(74) *Attorney, Agent, or Firm* — Intellectual Valley Law, P.C.

(57) ABSTRACT

The present application discloses a needle for repairing an alignment layer on a liquid crystal display substrate. The needle includes a needle tip; and a flexible material coating surrounding the needle tip.

12 Claims, 9 Drawing Sheets

(58) Field of Classification Search
USPC .......................................................... 349/56
See application file for complete search history.

(56) References Cited

U.S. PATENT DOCUMENTS

| | | | | |
|---|---|---|---|---|
| 2010/0294417 | A1* | 11/2010 | Onishi | ............... G02F 1/133711 |
| | | | | 156/64 |
| 2013/0139752 | A1 | 6/2013 | Song | |
| 2018/0320026 | A1* | 11/2018 | De Beer | ............ A61K 38/4893 |

FOREIGN PATENT DOCUMENTS

| | | | |
|---|---|---|---|
| CN | 102792215 | A | 11/2012 |
| CN | 102792216 | A | 11/2012 |
| JP | H10173346 | A | 6/1998 |
| WO | 2012086158 | A1 | 6/2012 |

OTHER PUBLICATIONS

International Search Report & Written Opinion dated Jun. 6, 2018, regarding PCT/CN2017/101020.

\* cited by examiner

NEEDLE FOR REPAIRING ALIGNMENT LAYER, ALIGNMENT LAYER REPAIRING APPARATUS, AND METHOD FOR REPAIRING ALIGNMENT LAYER

CROSS-REFERENCE TO RELATED APPLICATION

This application is a national stage application under 35 U.S.C. § 371 of International Application No. PCT/CN2017/101020, filed Sep. 8, 2017, the contents of which are incorporated by reference in the entirety.

TECHNICAL FIELD

The present invention relates to display technology, and more particularly, to a needle for repairing an alignment layer, an alignment layer repairing apparatus, and a method for repairing an alignment layer.

BACKGROUND

A liquid crystal display apparatus produces an image by applying an electric field to a liquid crystal layer between an array substrate and a package substrate (e.g., a color filter substrate). The electric field changes an alignment direction of the liquid crystal molecules in a liquid crystal layer. Light transmittance of the liquid crystal layer is adjusted when the alignment direction of the liquid crystal molecules changes. The liquid crystal molecules in a liquid crystal display apparatus should be pro-aligned in a direction to normally operate the liquid crystal between two display substrates. Typically, an alignment layer is formed on a liquid crystal display substrate to pre-align the liquid crystal molecules in the liquid crystal display apparatus.

SUMMARY

In one aspect, the present disclosure provides a needle for repairing an alignment layer on a liquid crystal display substrate, comprising a needle tip; and a flexible material coating surrounding the needle tip.

Optionally, the flexible material coating comprises a cured polymer material made from a curable fluid polymer material.

Optionally, the curable fluid polymer material is curable by ultraviolet irradiation.

Optionally, the flexible material coating comprises an elastomer.

Optionally, the needle tip has a diameter in a range of approximately 10 µm to approximately 20 µm.

Optionally, the flexible material costing has a diameter in a range of approximately 10 µm to approximately 100 µm.

In another aspect, the present disclosure provides an alignment layer repairing apparatus, comprising the needle described herein.

Optionally, the alignment layer repairing apparatus further comprises a defect detection device configured to detect a defect in the alignment layer and determine a relative position of the defect in the alignment layer on the liquid crystal display substrate.

In another aspect, the present disclosure provides a method of repairing an alignment layer on a liquid crystal display substrate, comprising providing a needle having a needle tip and a flexible material coating surrounding the needle tip; and coating a defect in the alignment layer with an alignment layer repairing agent using the needle having the flexible material coating surrounding the needle tip.

Optionally, prior to providing the needle, the method further comprises forming the flexible material coating surrounding the needle tip.

Optionally, forming the flexible material coating surrounding the needle tip comprises applying a curable fluid polymer material surrounding the needle tip; and curing the curable fluid polymer material thereby forming the flexible material coating surrounding the needle tip.

Optionally, applying the curable fluid polymer material comprises pushing the curable fluid polymer material out of the needle through the needle tip, thereby forming a liquid layer of the curable fluid polymer material surrounding the needle tip.

Optionally, prior to coating the defect, the method further comprises applying the alignment layer repairing agent on the flexible material coating.

Optionally, applying the alignment layer repairing agent on the flexible material coating comprises dipping the flexible material coating in an alignment layer repairing agent.

Optionally, subsequent to applying the alignment layer repairing agent on the flexible material coating, the method further comprises contacting the flexible material coating with the liquid crystal display substrate at a position corresponding to the defect in the alignment layer.

Optionally, subsequent to coating the defect, the method further comprises curing the alignment layer repairing agent coated in the defect thereby repairing the defect in the alignment layer.

Optionally, prior to coating the defect, the method further comprises detecting the defect in the alignment layer, and determining a relative position of the defect in the alignment layer on the liquid crystal display substrate.

Optionally, the needle tip has a diameter in a range of approximately 10 µm to approximately 20 µm.

In another aspect, the present disclosure provides a method of fabricating a needle for repairing an alignment layer on a liquid crystal display substrate, comprising providing a needle having a needle tip; applying a curable fluid polymer material surrounding the needle tip; and curing the curable fluid polymer material thereby forming a flexible material coating surrounding the needle tip.

Optionally, applying the curable fluid polymer material comprises pushing the curable fluid polymer material out of the needle through the needle tip, thereby forming a liquid layer of the curable fluid polymer material surrounding the needle tip.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In the process of preparing an alignment layer on a liquid crystal display substrate, defects may form on the alignment layer. For example, the defects may be caused by physical damages such as scratches or bubbles formed on the alignment layer. The alignment layer has a typical thickness in a range of approximately 500 Å to approximately 1000 Å. To repair a defect such as an indentation (a hole) on the alignment layer is difficult using a conventional ink-repairing method because the conventional ink-repairing method can only form a layer of a thickness in the micrometer scale at the indentation. Accordingly, when the defects occur on the alignment layer, the entire alignment layer has to be removed, and a new alignment layer has to be formed, significantly increasing the manufacturing costs.

Accordingly, the present disclosure provides, inter alia, a needle for repairing an alignment layer, an alignment layer repairing apparatus, and a method for repairing an alignment layer that substantially obviate one or more of the problems due to limitations and disadvantages of the related art. In one aspect, the present disclosure provides a needle for repairing an alignment layer on a liquid crystal display substrate. In some embodiments, the needle for repairing an alignment layer on a liquid crystal display substrate includes a needle tip and a flexible material coating surrounding the needle tip. As used herein, the term "needle" refers to a needle-shaped object such as an elongated, cylindrical or non-cylindrical object. The needle-shaped object may be hollow or non-hollow. The cross-section of the needle-shaped object may be of any appropriate shape and size. Examples of needles include, but are not limited to, capillaries, micro-pipets, ultra-thin injection needles, micro-syringes, and microelectrodes. Optionally, the liquid crystal display substrate is a liquid crystal array substrate. Optionally, the liquid crystal display substrate is a package substrate (e.g., a color filter substrate). As used herein, the term "flexible material" refers to an elastic and deformable material, such as an elastomer.

Figure 1:
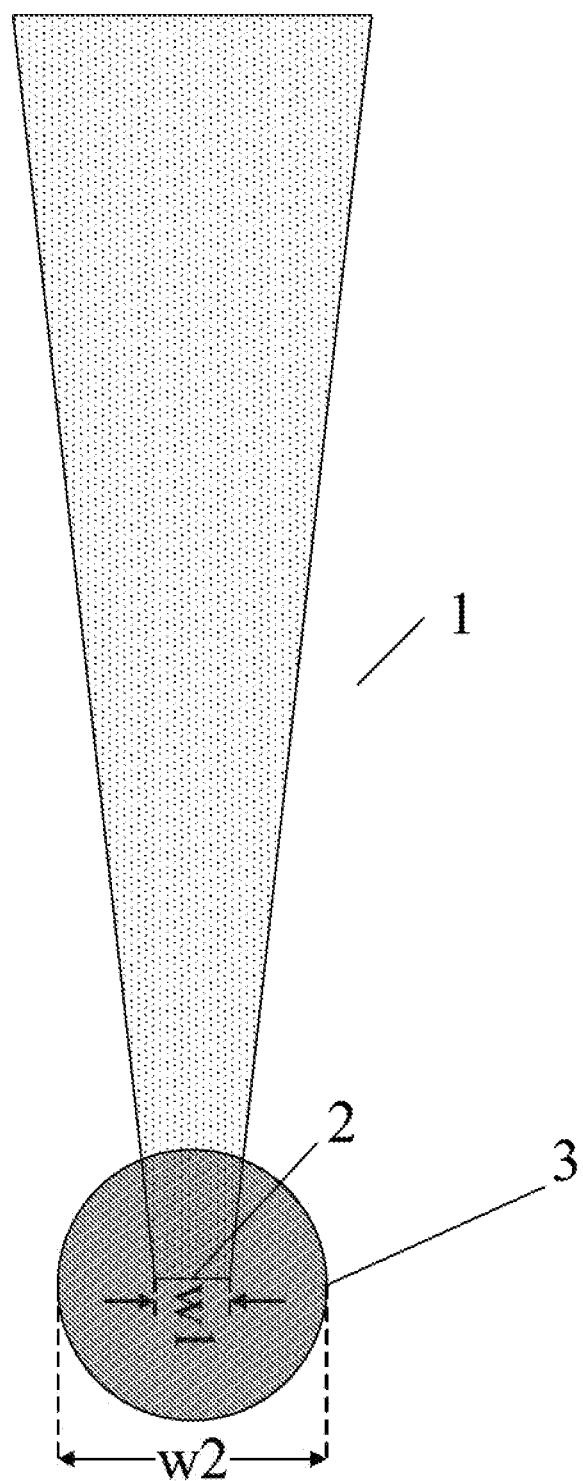
FIG. 1 is a schematic diagram illustrating the structure of a needle for repairing an alignment layer in some embodiments according to the present disclosure.

FIG. 1 is a schematic diagram illustrating the structure of a needle for repairing an alignment layer in some embodiments according to the present disclosure. Referring to FIG. 1, the needle 1 includes a needle tip 2 and a flexible material coating 3 surrounding the needle tip 2. The needle tip 2 and the flexible material coating 3 may be formed separately, as shown in FIG. 1. Optionally, the needle tip 2 and the flexible material coating 3 may be integrally formed, e.g., formed into a single piece. Optionally, the needle tip 2 and the flexible material coating 3 may be made of different materials or formed in different processes. Optionally, the needle tip 2 and the flexible material coating 3 may be made of a same material or formed in a single process.

Referring to FIG. 1, the needle tip 2 has a diameter w1, and the flexible material coating 3 has a diameter w2. Optionally, w1 is in a range of approximately 10 μm to approximately 20 μm. Optionally, w2 is in a range of approximately 10 μm to approximately 100 μm. Optionally, w2 has a value that is approximately 1.05 to 10 times of that of w1.

Various appropriate flexible materials may be used for making the flexible material coating 3. Examples of suitable flexible materials include elastomers (i.e., viscoelastic polymers) such as polyimides, polysilicones, polysiloxanes, rubbers, urethane polyimides, polyepoxides, and so on. Optionally, the flexible material coating 3 is made of polyimide.

In some embodiments, the flexible material coating 3 is a cured polymer material made from a curable fluid polymer material. The curable fluid polymer material may be applied as a layer or a droplet surrounding the needle tip 2, and cured to form the flexible material coating 3. Various curing methods may be used to cure the curable fluid polymer material, e.g., by heat, by irradiation (e.g., UV irradiation), by chemicals (e.g., crosslinking by sulfur), and so on. In one example, the flexible material coating 3 includes polyimide, and the curing is performed by UV irradiation. In another example, the flexible material coating 3 includes rubber, the curable fluid polymer material includes unsaturated rubber, and the curing is performed by cross-linking the unsaturated rubber. In another example, the curable fluid polymer material is an alignment layer repairing agent for repairing the alignment layer.

Figure 2:
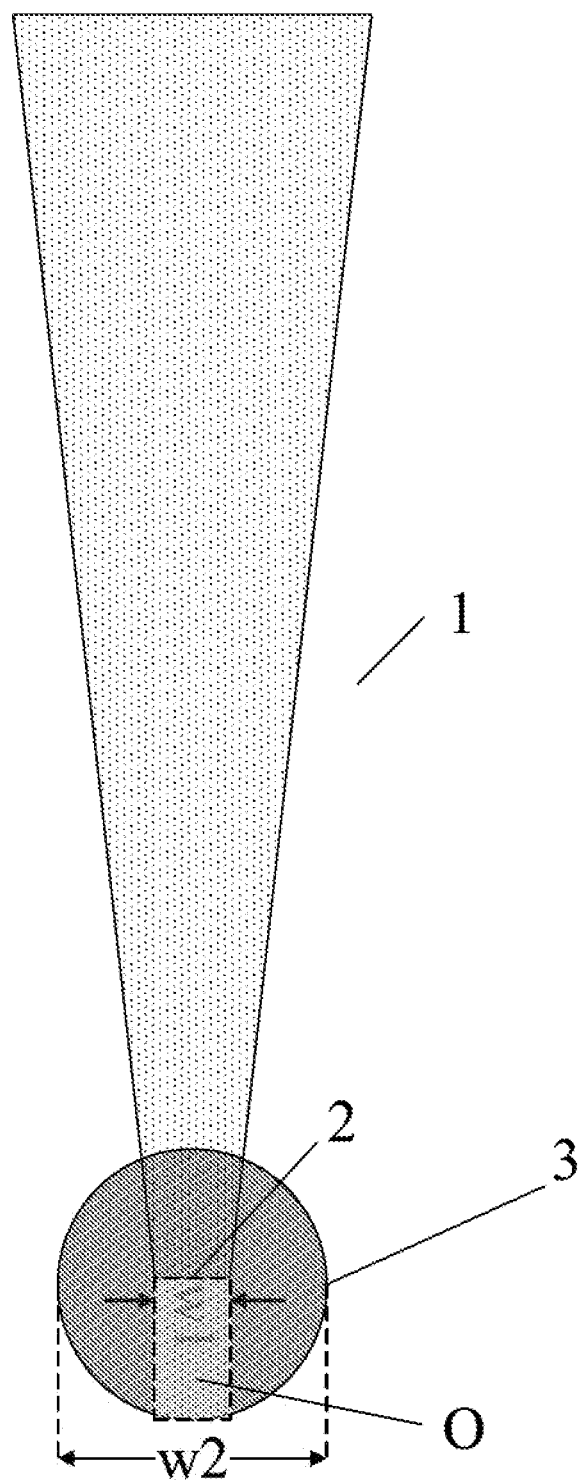
FIG. 2 is a schematic diagram illustrating the structure of a needle for repairing an alignment layer in some embodiments according to the present disclosure.

FIG. 2 is a schematic diagram illustrating the structure of a needle for repairing an alignment layer in some embodiments according to the present disclosure. Referring to FIG. 2, the needle 1 in FIG. 2 has an opening O extending from the needle tip 2 through the flexible material coating 3 surrounding the needle tip 2. The opening O allows a fluid (e.g., an alignment layer repairing agent) contained in the needle to be dispensed out of the needle. As a comparison, the needle 1 in FIG. 1 does not have an opening extending through the flexible material coating 3. Thus, the needle 1 in FIG. 1 is a needle sealed at one end.

Figure 3:
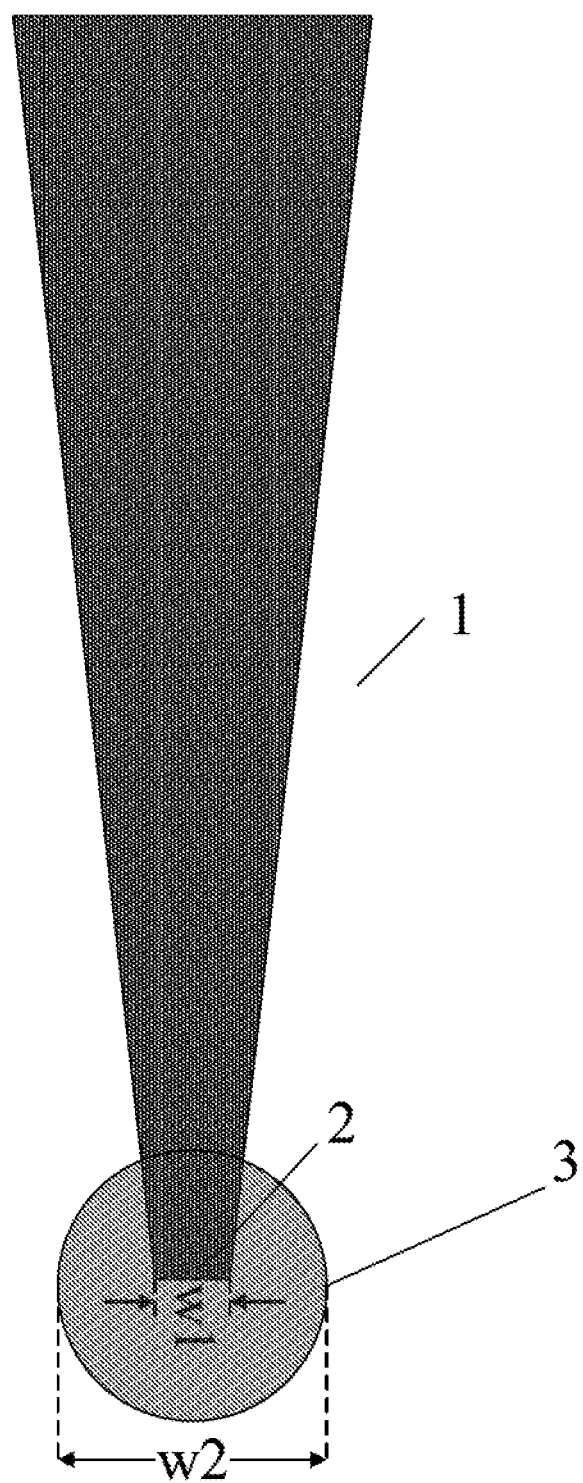
FIG. 3 is a schematic diagram illustrating the structure of a needle for repairing an alignment layer in some embodiments according to the present disclosure.

FIG. 3 is a schematic diagram illustrating the structure of a needle for repairing an alignment layer in some embodiments according to the present disclosure. Referring to FIG. 3, the needle 1 in some embodiments is a non-hollow needle not having a hollow chamber to hold a liquid. As a comparison, the needle 1 in FIG. 1 or FIG. 2 is a hollow needle capable of holding a liquid in a hollow chamber.

The flexible material coating 3 may have any appropriate shape. Examples of suitable shapes for the flexible material coating 3 include, but are not limited to, the shapes of sphere, bead, ring, cylinder, granule, particulate, or an irregular shape. The surface of the flexible material coating 3 may be smooth. Optionally, the flexible material coating 3 has a textured surface.

In some embodiments, a ratio of w2 (a diameter of the flexible material coating 3) to w1 (a diameter of the needle tip 2) is in a range of approximately 1.05:1 to approximately 10:1, e.g., approximately 1.05:1 to approximately 5:1, approximately 1.05:1 to approximately 2:1, approximately 1.1:1 to approximately 2:1, and approximately 1.2:1 to approximately 1.5:1. Optionally, w2 is in a range of approximately 10 μm to approximately 100 μm, e.g., approximately 10 μm to approximately 50 m, approximately 10 μm to approximately 40 μm, approximately 10 μm to approximately 30 μm, and approximately 15 μm to approximately 20 μm.

In another aspect, the present disclosure provides an alignment layer repairing apparatus. In some embodiments, the alignment layer repairing apparatus includes a needle described herein or fabricated by a method described herein. Optionally, the alignment layer repairing apparatus further includes a defect detection device configured to detect a defect in the alignment layer and determine a relative position of the defect in the alignment layer on the liquid crystal display substrate.

Figure 4:
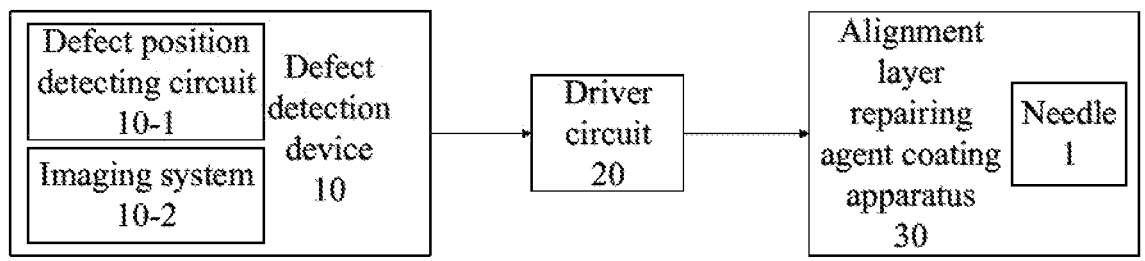
FIG. 4 is a schematic diagram illustrating the structure of an alignment layer repairing apparatus in some embodiments according to the present disclosure.

FIG. 4 is a schematic diagram illustrating the structure of an alignment layer repairing apparatus in some embodiments according to the present disclosure. Referring to FIG. 4, the alignment layer repairing apparatus in some embodiments includes a defect detection device 10, a driver circuit 20, and an alignment layer repairing agent coating apparatus 30. The alignment layer repairing agent coating apparatus 30 includes a needle 1 described herein or fabricating by a method described herein. Optionally, the alignment layer repairing agent coating apparatus 30 further includes other components such as a rack for holding the needle 1 and optionally tubing for connecting the needle 1 with a liquid. The defect detection device 10 in some embodiments includes a defect position detecting circuit 10-1 and an imaging system 10-2. The imaging system 10-2 detects a defective position of the alignment layer, and the defect position detecting circuit 10-1 records a signal indicating the coordinate corresponding to the defective position. Movements of the alignment layer repairing agent coating apparatus 30 is controlled by the driver circuit 20. The driver circuit 20 is configured to receive the signal indicating the coordinate corresponding to the defective position from the defect position detecting circuit 10-1, and is configured to control the alignment layer repairing agent coating apparatus 30 to move the alignment layer repairing agent coating apparatus 30 above the defective position. Optionally, the imaging system 10-2 includes a camera, e.g., a charge coupling device (CCD). Optionally, the alignment layer repairing apparatus includes an automated optical inspection system.

In another aspect, the present disclosure provides a method of fabricating a needle for repairing an alignment layer on a liquid crystal display substrate. In some embodiments, the method includes providing a needling having a needle tip; applying a curable fluid polymer material surrounding the needle tip; and curing the curable fluid polymer material thereby forming a flexible material coating surrounding the needle tip. Optionally, the step of applying the curable fluid polymer material comprises pushing the curable fluid polymer material out of the needle through the needle tip, thereby forming a liquid layer of the curable fluid polymer material surrounding the needle tip.

Figure 5A:
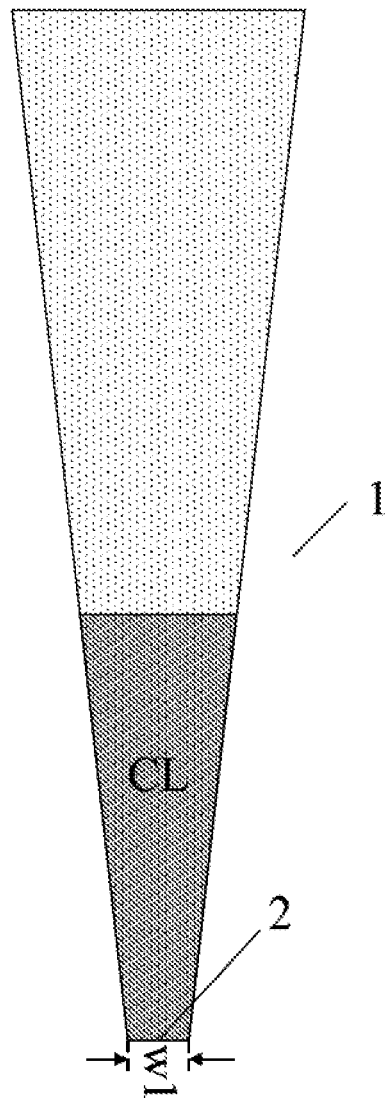
FIGS. 5A to 5C illustrate a process of fabricating a needle for repairing an alignment layer in some embodiments according to the present disclosure.
Figure 5B:
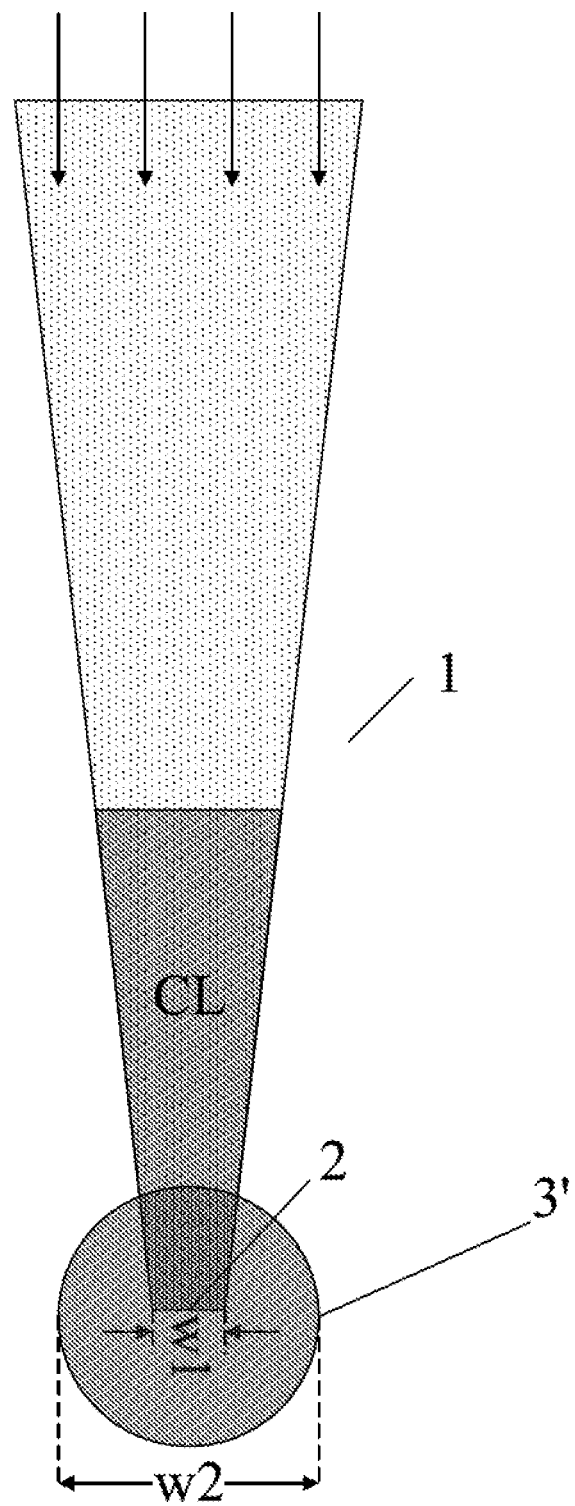
Figure 5C:
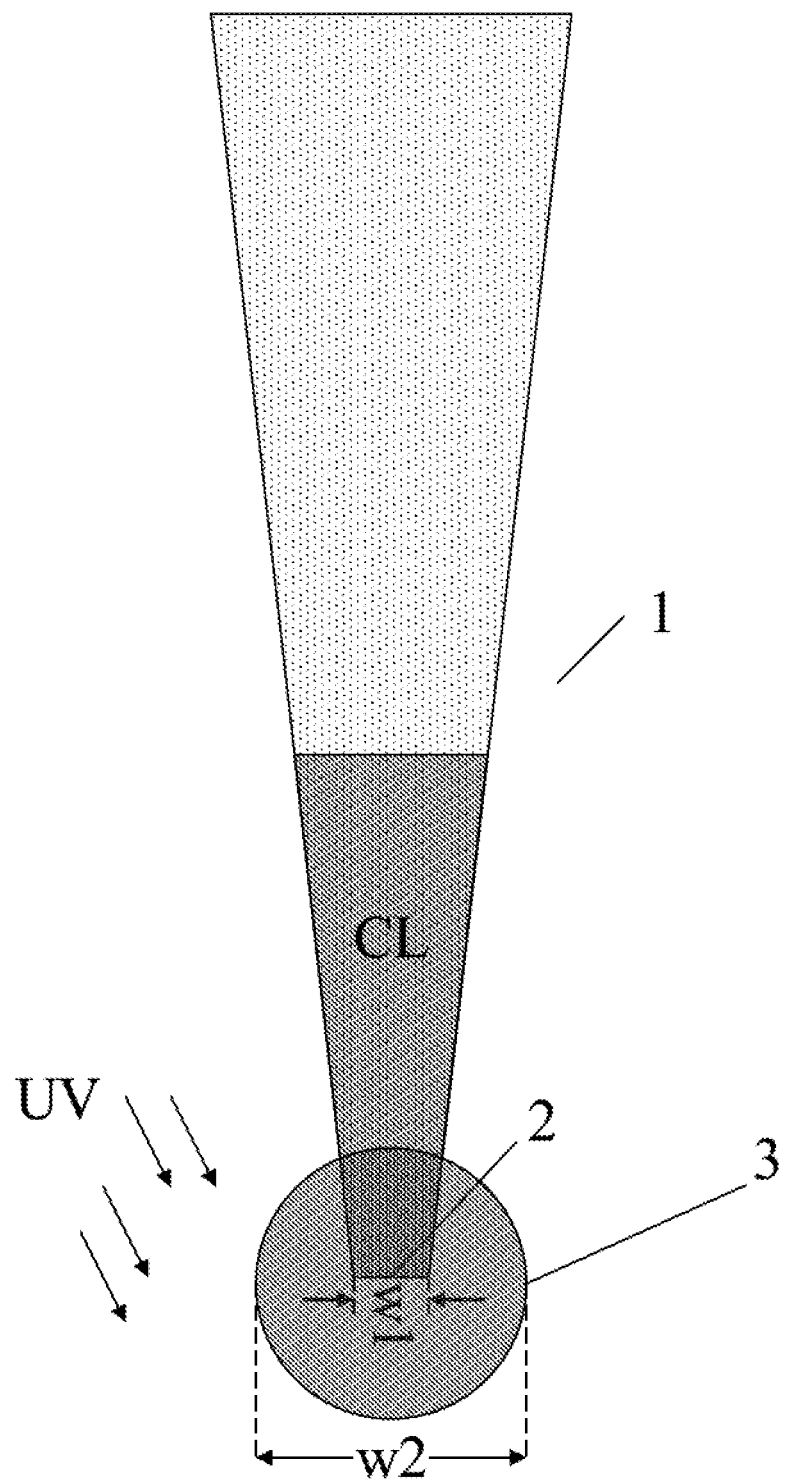

FIGS. 5A to 5C illustrate a process of fabricating a needle for repairing an alignment layer in some embodiments according to the present disclosure. Referring to FIG. 5A, a needle 1 having a needle tip 2 is provided. The needle tip 2 has a diameter w1. Optionally, the diameter w1 is in a range of approximately 10 μm to approximately 20 μm. A curable fluid polymer material CL is dispensed into the needle 1. Referring to FIG. 5B, a pressure is applied inside the chamber of the needle 1, thereby pushing a certain amount of curable fluid polymer material CL through the opening of the needle tip 2. The curable fluid polymer material CL pushed out of the needle tip 2 attaches to the external surface of the needle tip 2, forming a droplet or a layer 3' of the curable fluid polymer material CL surrounding the needle tip 2. The droplet or the layer 3' of the curable fluid polymer material CL has a diameter w2. Optionally, the diameter w2 is in a range of approximately 10 μm to approximately 100 μm. Referring to FIG. 5C, the droplet or the layer of the curable fluid polymer material CL is then cured by U irradiation, thereby forming the flexible material coating 3 surrounding the needle tip 2.

Figure 6:
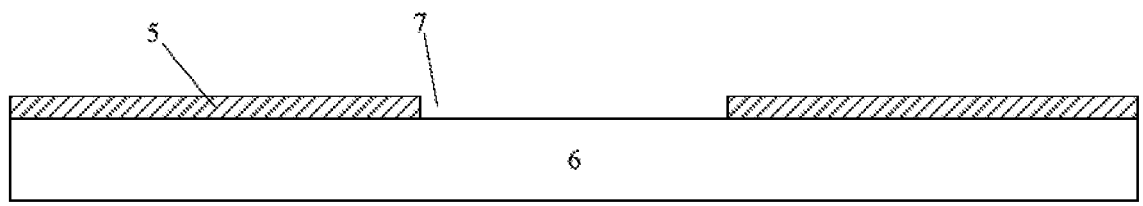
FIG. 6 is a diagram illustrating the structure of an alignment layer having a defect on a liquid crystal display substrate in some embodiments according to the present disclosure.

FIG. 6 is a diagram illustrating the structure of an alignment layer having a defect on a liquid crystal display substrate in some embodiments according to the present disclosure. Referring to FIG. 6, the alignment layer 5 on the liquid crystal display substrate 6 contains a defect 7. As shown in FIG. 6, the defect 7 is an indentation in the alignment layer 5, e.g., the material of the alignment layer 5 is missing in a region corresponding to the defect 7.

In another aspect, the present disclosure provides a method of repairing an alignment layer on a liquid crystal display substrate. In some embodiments, the method includes providing a needle having a needle tip and a flexible material coating surrounding the needle tip; and coating a defect in the alignment layer with an alignment layer repairing agent using the needle having the flexible material coating surrounding the needle tip. Optionally, prior to providing the needle, the method further includes forming the flexible material coating surrounding the needle tip. Optionally, the step of forming the flexible material coating surrounding the needle tip includes applying a curable fluid polymer material surrounding the needle tip; and curing the curable fluid polymer material thereby forming the flexible material coating surrounding the needle tip. Optionally, the step of applying the curable fluid polymer material comprises pushing the curable fluid polymer material out of the needle through the needle tip, thereby forming a liquid layer of the curable fluid polymer material surrounding the needle tip. Optionally, prior to coating the defect, the method further includes applying the alignment layer repairing agent on the flexible material coating. Optionally, the step of applying the alignment layer repairing agent on the flexible material coating includes dipping the flexible material coating in an alignment layer repairing agent. Optionally, subsequent to applying the alignment layer repairing agent on the flexible material coating, the method further includes contacting the flexible material coating with the liquid crystal display substrate at a position corresponding to the defect in the alignment layer. Optionally, subsequent to coating the defect, the method further includes curing the alignment layer repairing agent coated in the defect thereby repairing the defect in the alignment layer. Optionally, prior to coating the defect, the method further includes detecting the defect in the alignment layer; and determining a relative position of the defect in the alignment layer on the liquid crystal display substrate. Optionally, the needle tip has a diameter in a range of approximately 10 μm to approximately 20 sm. Optionally, the alignment layer repairing agent includes polyimide.

Figure 7A:
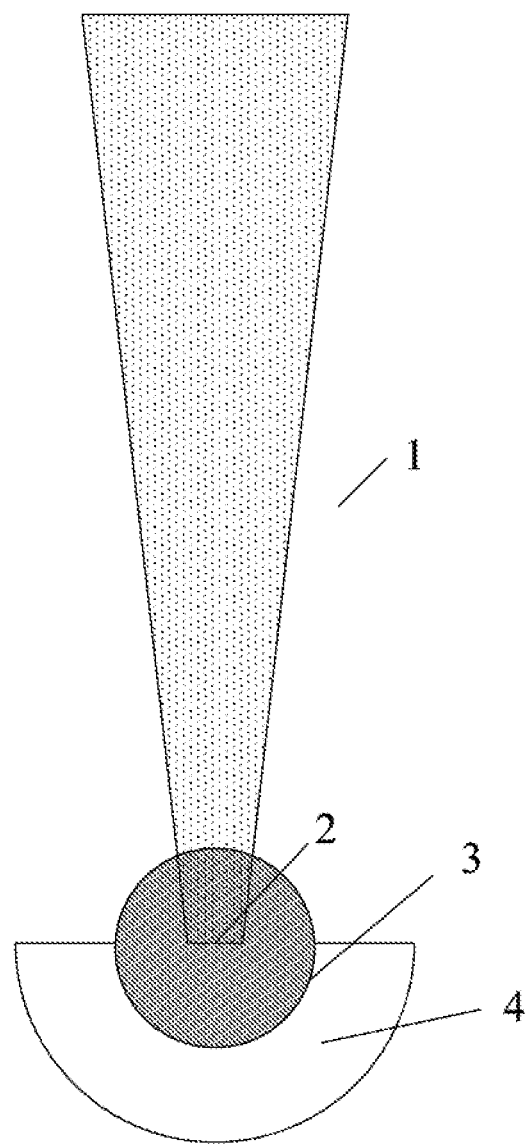
FIGS. 7A to 7D illustrate a process of repairing an alignment layer on a liquid crystal display substrate.
Figure 7B:
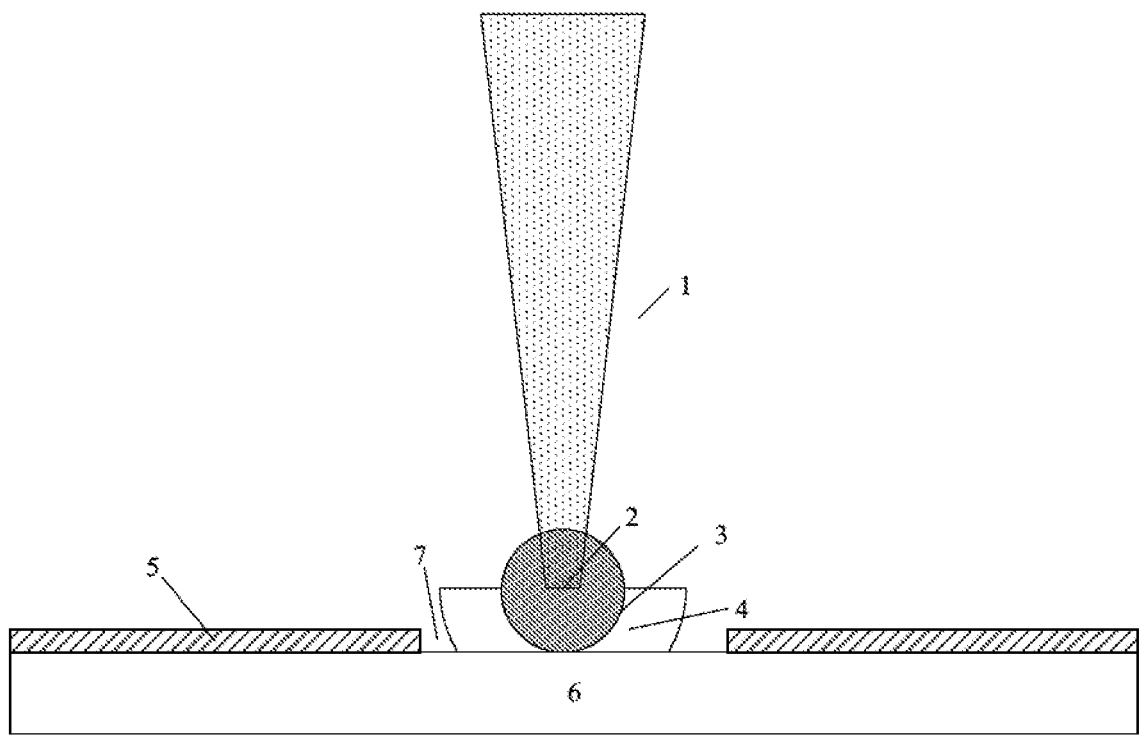
Figure 7C:
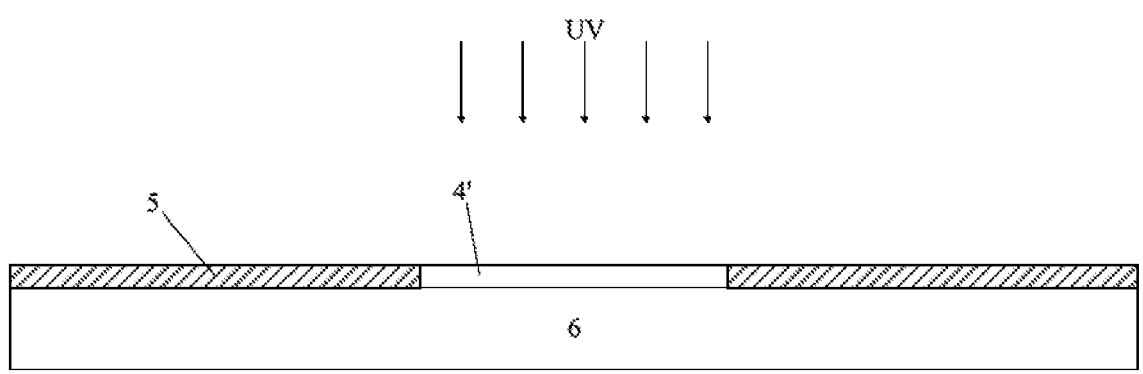
Figure 7D:
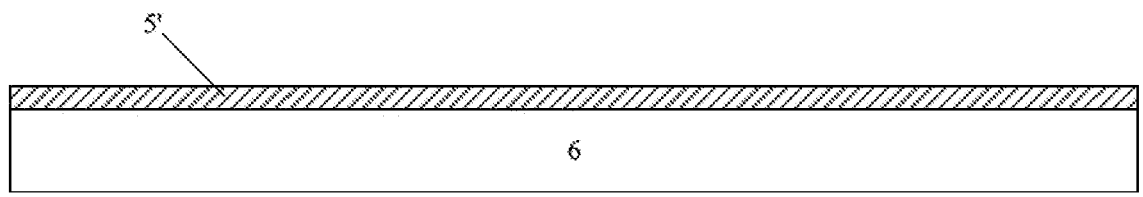

FIGS. 7A to 7D illustrate a process of repairing an alignment layer on a liquid crystal display substrate. As shown in FIG. 6, a defect 7 is detected in the alignment layer 5, and the relative position of the defect 7 is determined. Referring to FIG. 7A, a needle 1 having a needle tip 2 and a flexible material coating 3 surrounding the needle tip 2 is used for repairing the defect in the alignment layer. A layer 4 of alignment layer repairing agent is applied on the flexible material coating 3, for example, by dipping the flexible material coating 3 in the alignment layer repairing agent. Referring to FIG. 7B, the needle 1 having the layer 4 of alignment layer repairing agent applied on the flexible material coating 3 is moved to a position corresponding to the defect 7 on the alignment layer 5. The repairing method in some embodiments further includes coating the alignment layer repairing agent on the portion of the alignment layer 5 corresponding to the defect 7, thereby repairing the alignment layer 5. Optionally, the needle 1 is made to be in contact with the defect 7 in order to better repair the defect 7 on the alignment layer 5. Optionally, the needle 1 is moved around at the position corresponding to the defect 7, e.g., in a S-shape pattern, thereby evenly coating the alignment layer repairing agent on the portion of the alignment layer 5 corresponding to the defect 7. Because the needle 1 has a flexible material coating 3, the movement of the needle 1 will not damage the alignment layer 5. Referring to FIG. 7C, once the alignment layer repairing agent is coated on the alignment layer 5, the needle 1 can be moved away from the alignment layer. Subsequently, a repaired portion 4' (made of the alignment layer repairing agent) coated on the portion of the alignment layer 5 corresponding to the defect is cured, e.g., by UV irradiation, thereby repairing the alignment layer. As shown in FIG. 7C, the present needle 1 having the flexible material coating 3 surrounding the needle tip 2 is capable of forming a repaired portion 4' having a thickness substantially the same as other portions of the alignment layer 5, e.g., a thickness in a range of approximately 500 Å to approximately 1000 Å. FIG. 7D shows an alignment layer repaired by the present method. As shown in FIG. 7D, the alignment layer repaired by the present method has a smooth and even surface, and a substantially uniform thickness.

In some embodiments, the method further includes calibrating a position of the needle relative to the liquid crystal display substrate (and the alignment layer thereon). In one example, the needle can be moved to a selected position on the liquid crystal display substrate, e.g., manually. In one example, a distance between the needle tip and the substrate can be gradually decreased until the needle tip is just in contact with the surface of the substrate. For example, when the needle tip is just touching the surface of the substrate, a slight vibration motion of the needle may be observed or detected. The relative position of the needle corresponding to the touch position may be recorded by the imaging system (e.g., a camera). Once the position of the needle relative to the liquid crystal display substrate is calibrated, the needle can be used for repairing a defect in the alignment layer once the defect position is determined.

Optionally, a plurality of needles may be prepared for repairing one alignment layer. Optionally, at least two of the plurality of needles are of different sizes (e.g., diameters).

The present method may be used to repair various types of defects on the alignment layer. In some embodiments, the defect is one other than an indentation on the alignment layer. For example, the defect in some embodiments is a bulge on the alignment layer, e.g., one caused by a bubble or a particle underneath the alignment layer. In some embodiments, the method of repairing the alignment layer on a liquid crystal display substrate further includes first removing a bulge on the alignment layer, e.g., using a high energy plasma, thereby forming an indentation on the alignment layer. Subsequently, the indentation may be filled by the method described above, e.g., using a needle having a flexible material coating surrounding its needle tip.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of repairing an alignment layer on a liquid crystal display substrate, comprising:
   providing a needle having a needle tip and a flexible material coating surrounding the needle tip; and
   coating a defect in the alignment layer with an alignment layer repairing agent using the needle having the flexible material coating surrounding the needle tip;
   wherein, prior to providing the needle, the method further comprises forming the flexible material coating surrounding the needle tip;
   wherein forming the flexible material coating surrounding the needle tip comprises:
   applying a curable fluid polymer material surrounding the needle tip; and
   curing the curable fluid polymer material thereby forming the flexible material coating surrounding the needle tip.

2. The method of claim 1, wherein the need tip is a tip of a hollow needle capable of holding the curable fluid polymer material in a hollow chamber; and
   the method further comprises, prior to applying the curable fluid polymer material surrounding the needle tip, holding the curable fluid polymer material in the hollow chamber of the hollow needle.

3. The method of claim 2, wherein the needle tip has an opening configured to allow the curable fluid polymer material to be dispensed out of the needle tip to be cured;
   applying the curable fluid polymer material comprises pushing the curable fluid polymer material out of the needle through the opening of the needle tip, thereby forming a liquid layer of the curable fluid polymer material surrounding the needle tip.

4. The method of claim 1, prior to coating the defect, further comprising applying the alignment layer repairing agent on the flexible material coating.

5. The method of claim 4, wherein applying the alignment layer repairing agent on the flexible material coating comprises dipping the flexible material coating in an alignment layer repairing agent.

6. The method of claim 4, subsequent to applying the alignment layer repairing agent on the flexible material coating, further comprising contacting the flexible material coating with the liquid crystal display substrate at a position corresponding to the defect in the alignment layer.

7. The method of claim 1, subsequent to coating the defect, further comprising curing the alignment layer repairing agent coated in the defect thereby repairing the defect in the alignment layer.

8. The method of claim 1, prior to coating the defect, further comprising detecting the defect in the alignment layer; and
   determining a relative position of the defect in the alignment layer on the liquid crystal display substrate.

9. The method of claim 1, wherein the needle tip has a diameter in a range of approximately 10 μm to approximately 20 μm.

10. A method of fabricating a needle for repairing an alignment layer on a liquid crystal display substrate, comprising:

providing a needle having a needle tip;

applying a curable fluid polymer material surrounding the needle tip; and curing the curable fluid polymer material thereby forming a flexible material coating surrounding the needle tip.

11. The method of claim 10, wherein applying the curable fluid polymer material comprises pushing the curable fluid polymer material out of the needle through an opening of the needle tip, thereby forming a liquid layer of the curable fluid polymer material surrounding the needle tip.

12. The method of claim 10, wherein the need tip is a tip of a hollow needle capable of holding the curable fluid polymer material in a hollow chamber; and
   the method further comprises, prior to applying the curable fluid polymer material surrounding the needle tip, holding the curable fluid polymer material in the hollow chamber of the hollow needle.

* * * * *